May 12, 1959 E. C. MILLER 2,885,922
OPTICAL ANALYZER FOR FLUIDS
Filed Oct. 1, 1953
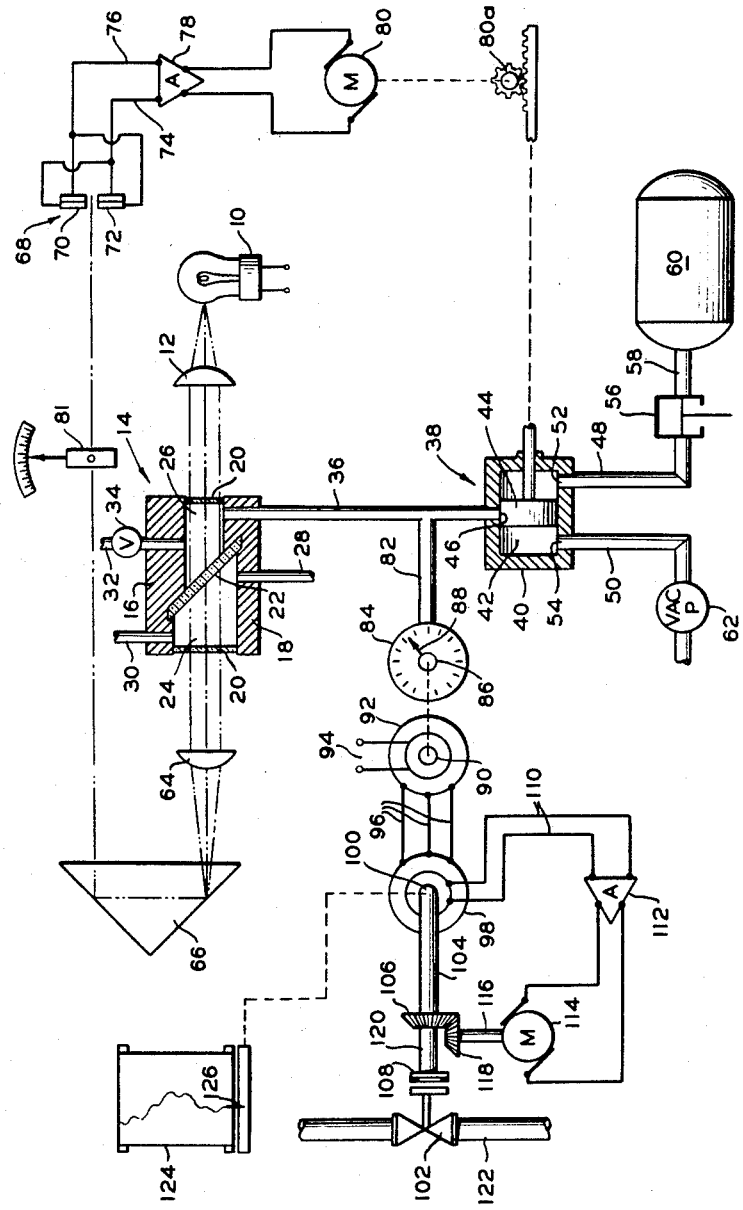
INVENTOR.
E. C. MILLER
BY Hudson & Young
ATTORNEYS

United States Patent Office 2,885,922
Patented May 12, 1959

2,885,922
OPTICAL ANALYZER FOR FLUIDS

Elmer C. Miller, Bartlesville, Okla., assignor to Phillips Petroleum Company, a corporation of Delaware Application October 1, 1953, Serial No. 383,586

11 Claims. (Cl. 88—14)

This invention relates to an analyzer. In another aspect this invention relates to a novel method and apparatus for analyzing a fluid making use of the index of refraction of the fluid.

Heretofore, considerable difficulty has been experienced in providing a simple, reliable mechanism for indicating the composition of a process stream. In accordance with this invention, I provide a novel method and apparatus, utilizing the principle of differential refraction, whereby the refractive index of a standard fluid or of a second sample or stream is compared with a sample or stream to be analyzed, and means are provided for automatically indicating the difference in refractive index. Manifestly, the difference in refractive index may be utilized in many automatic control operations, such as stabilizing a column in a refinery by automatic variation of heat to the column, or by controlling the depth of cracking in a tube furnace.

An important problem which exists wherever explosive fluids are being analyzed is to provide a method and apparatus which is essentially explosion proof. Generally speaking, however, it is desirable to maintain the instruments which are analyzing process streams close to the process stream being so analyzed. I have discovered a method and apparatus for analyzing a process stream utilizing the principle that the index of refraction of a fluid varies with the density of the fluid. An important advantage of my invention is that the instrument requires no moving parts or electrical motors to be near the process stream being analyzed.

It is an object of this invention to provide an improved continuous analyzing device utilizing the principle of differential refraction.

It is a further object to provide a method and apparatus for operating a differential refractometer in an explosive atmosphere.

It is a further object to provide a method and apparatus for analyzing a fluid stream utilizing the principle that the index of refraction of a fluid is proportional to the density of the fluid.

Various other objects, advantages and features of the invention will become apparent from the following detailed description taken in conjunction with the drawing which is a schematic diagram of an analyzer constructed in accordance with the invention.

Referring now to the drawing, there is provided a source of radiation 10. Light from the source 10 is directed through a lens 12 which collimates the radiation and the collimated beam is passed to a refractometer cell 14, in which the beam is deviated by an amount proportional to the difference in refractive indices of the two fluids contained therein. Refractometer cell 14 is formed from two complementary metal blocks 16 and 18 which define an inner passage closed at both ends by transparent windows 20. A diagonal transverse plate 22 of transparent material is mounted between blocks 16 and 18. Plate 22 thus serves to separate the inner passage of cell 14 into two sections, 24 and 26. Section 24 is provided with an inlet 28 and an outlet 30 and section 26 is provided with an outlet 32 and a valve 34 controlling outlet 32. Section 24 is thus adapted to contain a fluid process stream to be analyzed and section 26 is adapted to contain a reference fluid, the index of refraction of which is to be compared to the index of refraction of the fluid stream in section 24. Section 26 also has an inlet conduit 36 which is connected to a piston operated valve 38. Valve 38 comprises a cylindrical shell 40, which defines a piston chamber 42, and has a piston 44 slidably operating therein. Inlet conduit 36 extends through an outlet port 46 located approximately at the middle of valve 38 and communicates with chamber 42. A pressure conduit 48 and a vacuum conduit 50 also extend through shell 40 through inlet ports 52 and 54, respectively, in valve 38. The position of ports 46, 52 and 54 is so arranged that, as piston 44 moves leftwardly from one end to the other end of chamber 42, said ports are opened and closed in this sequence: (a) port 52 closed and ports 46 and 54 open; (b) port 46 closed and ports 52 and 54 open; and (c) port 54 closed and ports 52 and 46 open. Pressure conduit 48 is connected to a compressing means 56, such as an air compressor, and compressing means 56 is connected by conduit 58 to a reference fluid tank 60. Vacuum conduit 50 is connected to a pressure decreasing means 62, such as a vacuum pump. It is thus apparent that I have provided an apparatus for varying the density of the reference fluid in section 26 of refractometer cell 14.

The beam of radiation leaving refractometer cell 14 passes through a lens 64 which converges the beam of radiation and directs it upon a stationary prism 66. The beam of radiation is reflected within prism 66 and then impinges on a split twin detector unit 68. The detector unit 68 comprises detectors 70 and 72, and, when visible light is employed for purposes of analysis, detectors 70 and 72 are preferably photoelectric cells. If infrared radiation is employed for the analysis, detectors 70 and 72 can be replaced by bolometers, thermistors, or other suitable infrared detectors; if other frequencies of radiation are employed, suitable detectors therefor are provided. As illustrated in the drawing, detectors 70 and 72 are connected in opposition by means of electrical leads 74 and 76 so as to produce a resultant voltage proportional to the difference in total radiation impinging upon the two detector cells. The voltage appearing between leads 74 and 76 is amplified by a unit 78, the output of which is fed to a reversible motor 80. Motor 80 is mechanically connected, as by a rack and pinion 80a, to piston 44.

A rectangular prism 81 is disposed in the beam of radiation intermediate prism 66 and detector unit 68. Prism 81 is manually rotatable and affords a means for adjusting the beam to impinge upon detector unit 68 between detectors 70 and 72 at the zero or null point when operation is begun.

A conduit 82 connects a density sensing and indicating means 84 to conduit 36. Unit 84 can be any of the well known devices for indicating changes in density of a fluid, such as a pressure gage, and comprises a rotatable shaft 86 and an indicating arm 88. Unit 84 is preferably calibrated directly in degrees of index of refraction. The rotatable shaft 86 of unit 84 is mechanically connected to the rotor 90 of a synchro generator 92. The winding of generator 92 is excited by a source 94 of alternating current. Voltages appear at the three stator terminals of generator 92 which identify at every instant the angular position of shaft 86. The output of generator 92 is applied through wires 96 to the corresponding stator windings of a synchro control transformer 98. Transformer 98 has a rotor 100 which is mechanically connected to a means for controlling a process variable, such as a motor valve 102, as shown. In the drawing, rotor 100 is connected to motor valve 102 by a shaft 104, having a bevel gear 106 attached thereto, and a friction clutch 108.

In order to achieve adequate power for the operation of motor valve 102 by transformer 98, the rotor output voltage of transformer 98 is applied through wires 110 to an amplifying unit 112 and the output amplifier unit 112 is fed to a reversible motor 114. Motor 114 has a shaft 116 on which is secured a bevel gear 118, which meshes with bevel gear 106. A friction clutch 108 is manually engaged to operate motor valve 102. A process stream flows through conduit 122, and motor valve 102 controls this process stream. This process stream can be any one which affects the refractive index of the fluid passing through the sample chamber so that a process variable is regulated to maintain the refractive index of the sample at a predetermined value. For example, the sample can be fluid withdrawn from a selected tray of a fractionating column, the refractive index of this fluid being maintained constant by varying the amount of reboiler steam or alternatively, reflux passing through line 122. In a mixing system, the refractive index of the mixture can be maintained constant by varying the amount of a component of the mixture back through line 122. A chart 124 and a pen arm 126, which is mechanically connected to rotor 100, is provided to supply a record of the analysis of the process stream.

In the operation of the apparatus shown, with a sample of the effluent or cracked gas from a butane cracking furnace in cell 24 and air in cell 26, rectangular prism 81 is adjusted initially so that the deflected light beam strikes the central portion of unit 68. The beam can be adjusted so that it falls between detector cells 70 and 72 or so that a portion of it strikes a small equal portion of both cells 70 and 72. Under such conditions the output voltage of the detector unit 68 is zero, resulting in no current being fed to motor 80. Assuming, for example, that the refractive index of the cracked gas in section 24 varies to shift the radiation beam in a direction such that more radiation impinges upon detector 70 than upon detector 72, a voltage of a first polarity then is produced between leads 74 and 76 by the interaction of detectors 70 and 72. This voltage is amplified by unit 78 and applied to motor 80. The output rotation of motor 80, in turn, is applied through the mechanical linkage 80a, to actuate piston 44 in valve 38 in a first direction, thereby changing, for example, increasing the density of the air in section 26 of the refractometer cell 14. A shift in deflection of the beam back to the initial position between detector cells 70 and 72 is thereby produced. This actuation of piston 44 and resultant change of the density of the air continues until the radiation striking the two detector cells is equally divided, at which time rotation of motor 80 is stopped. The density of the air in section 26 is representative of the refractive index of the cracked gas in section 24 and this density is indicated by the position of arm 88 of density sensitive means 84. Should the refrective index of the cracked gas in section 24 vary in the opposite manner so as to shift the radiation beam in the other direction, thereby resulting in more radiation impinging upon detector 72 than upon detector 70, a voltage of second polarity is produced between leads 74 and 76. This second voltage rotates motor 80 in the opposite direction to actuate piston 44 in the reverse direction, i.e., to decrease the density of the air in cell 26, which is continued until the total radiation striking the two detector cells 70 and 72 is equal. The shaft 86 of density sensitive means 84 is mechanically connected to synchro generator 92 and the angular position of shaft 86 is thereby electrically transmitted to synchro control transformer 98. Rotation of the rotor 100 of generator 98 is mechanically and electrically transmitted to the process variable controlling means 102 which thereby automatically controls the process variable, for example, the amount of gas fed to the cracking furnace, to maintain the composition of the fluid in section 24 as desired.

It is well known practice to control various types of industrial processes by analysis of a sample stream removed from some point in the process, and by adjustment of a selected process variable in response to variations of a given property of the sample stream as determined by such analysis. Measurement of refractive index is one such system of analysis, and taking the example given above, the appropriate process variable would be one controlling the depth of cracking in the cracking furnace. Generally, my invention is applicable to any fluid having sufficient compressibility to afford a change in density such as to cause a measureable change in the refractive index of the fluid. Because liquids in general can be compressed only difficultly, I prefer a normally gaseous fluid as the reference fluid.

However, normally liquid fluids can be used as the reference fluid. For example, in a fractional distillation of 2-methyl-5-vinylpyridine from a mixture of 2-methyl-5-ethylpyridine and 2-methyl-5-vinylpyridine, a sample of overhead could be analyzed using 2-methyl-5-ethylpyridine (MEP) as a reference fluid. The index of refraction of MEP changes approximately 1 in the fifth place for each change in pressure of 10 p.s.i.a. and 1 in the fourth place for each change in pressure of 100 p.s.i.a. Any appropriate process variable in such a fractional distillation could be controlled by my invention to maintain a desired composition of material in the overhead stream.

Since the density of a gas depends on both pressure and temperature, it is apparent that a close temperature control of cell 14 is important. Cell 14 is shown as being constructed of blocks of metal 16 and 18 which have good heat conducting properties. To further insure the close control of temperature, to the end that the temperature of the sample stream and the reference gas are equal, the complementary blocks 16 and 18 can be equipped with a heat exchange system in the form of heat exchange coils, not shown, which are installed in the complementary blocks. Such a refractometer cell as this forms no part of the present invention and reference is made to the application of Francis W. Crawford for "Differential Refractometer" Serial No. 187,600 filed on Semptember 29, 1950, now U. S. Patent 2,724,304, for a disclosure of the details of a refractometer cell which affords satisfactory temperature control.

It will be apparent that I have provided a method and apparatus for analysis of fluids which requires no moving parts or electrical motors near the sample cell.

While certain preferred embodiments of this invention have been described for illustrative purposes the invention obviously is not limited thereto.

I claim:

1. An analyzer comprising, in combination, a radiation source, a detector unit, means for passing a beam of radiation from said source to said detector unit, a refractometer cell unit for refracting said beam in accordance with the difference between the refractive indices of two fluids contained therein, means to pass a sample fluid to said unit to form one of the fluids therein, means to pass a reference fluid to said unit, said reference fluid comprising a second fluid, said refractometer cell unit being disposed in the path of said beam of radiation, means responsive to departures of the output of said detector unit from a selected value to change the density of the second fluid in said cell unit and to thereby reversely refract said beam until said detector output again assumes said selected value, and means responsive to the density of said second fluid to provide an output representative of the density of said second fluid.

2. An analyzer comprising, in combination, a radiation source, a twin detector unit, means for passing a beam of radiation from said source to said detector unit, a refractometer cell unit for refracting said beam in accordance with the difference in refractive index between a first reference fluid and a second sample fluid disposed in adjacent sections thereof, said refractometer cell unit being disposed in the path of said beam of radiation, means for comparing the amounts of radiation incident upon the twin detectors of said unit, means actuated by said comparing means to change the density and thereby to change the index of refraction of said first fluid to thereby reversely refract said beam until a predetermined relationship exists between the amounts of radiation incident upon said twin detectors, and means responsive to the density of said second fluid to provide an output representative of the density of said first fluid.

3. An analyzer comprising, in combination, a radiation source, a twin detector unit, means for passing a beam of radiation from said source to a position between the detectors of said twin detector unit, a refractometer cell unit for refracting said beam in accordance with the difference in refractive indices between a first reference fluid and a second sample fluid disposed in adjacent sections thereof, said refractometer cell unit being disposed in the path of said beam of radiation, means for comparing the amounts of radiation incident upon the twin detectors of said unit, means actuated by said comparing means for changing the density of said first fluid to thereby reversely refract said beam until said beam is again directed to a position between the detectors of said twin detector unit, and means in communication with said second fluid for providing an output representative of the density of said first fluid.

4. An analyzer comprising, in combination, a radiation source, a split twin detector unit, means for passing a beam of radiation from said source to a position between the detectors of said detector unit, a refractometer having adjacent sections therein which are adapted to contain a first fluid which is to be analyzed and a second fluid which is a reference fluid, respectively, and refractometer cell unit being disposed in the path of said beam and thereby refracting said beam in accordance with the difference in indices of refraction between said first and second fluids, a source of said second fluid, a conduit means connecting said source of the second fluid to the one of said sections of the refractometer unit which is adapted to contain the second fluid, means for comparing the amounts of radiation incident upon the twin detectors of said detector unit, means disposed in said conduit means and actuated by said comparing means for changing the density of said second fluid until said beam is positioned between the detectors of said detector unit, and means communicating with the second fluid containing section of said refractometer for providing an output representative of the density of said second fluid.

5. The combination in accordance with claim 4 wherein said radiation source produces visible light and said detectors are photoelectric cells.

6. An analyzer in accordance with claim 4 wherein said means for changing the density of said second fluid comprises a valve having a common port and a pair of other ports, said other ports being selectively connected to said common port in accordance with the position of said valve, said conduit means extending through one of said other ports and through said common port, a density increasing means disposed in said conduit means intermediate to said source of said second fluid and said valve, a density decreasing means, and a second conduit means connecting said density decreasing means to the other of said other ports.

7. An analyzer in accordance with claim 4 wherein said means for changing the density of said second fluid comprises a metal shell defining a piston chamber, a centrally positioned outlet from said chamber, a pair of inlets to said chamber, each inlet being spaced from said outlet, a piston slidably operative in said chamber, said outlet and one of said inlets forming a part of said conduit means connecting said source of the second fluid to the section of the refractometer unit containing the second fluid, a density increasing means disposed in said conduit means intermediate to said source of the second fluid and said one of said inlets, a density decreasing means, and a conduit means connecting said density decreasing means to the other of said inlets.

8. An analyzer in accordance with claim 7 wherein said second fluid is air, said density increasing means is an air compressor and said density decreasing means is a vacuum pump.

9. An analyzer comprising, in combination, a radiation source, a split twin detector unit, means for passing a beam of radiation from said source to said detector unit, a refractometer cell unit having adjacent sections therein means for passing a first fluid which is to be analyzed in one of said sections, a second fluid which is a reference fluid disposed in the other of said sections, said refractometer cell unit being disposed in the path of said beam and thereby refracting said beam in accordance with the difference in indices of refraction between said first and second fluids, means for comparing the amounts of radiation incident upon the twin detectors of said detector unit, means actuated by said comparing means for changing the density and thereby the index of refraction of said second fluid to thereby reversely refract said beam until a predetermined relationship exists between the amounts of radiation incident upon the twin detectors of said detector unit, said comparing means comprising an electrical circuit connecting the electrical outputs of said twin detectors in opposition to produce a voltage representative of the difference in amounts of radiation incident upon said twin detectors, a reversible motor actuated by said voltage to actuate said means for changing the density of said second fluid, and means in communication with said second fluid for providing an output representative of the density of said second fluid.

10. An analyzer in accordance with claim 9 wherein said means for changing the density of said second fluid comprises means for increasing the density of said second fluid and thereby for increasing the index of refraction of said second fluid in response to an increase in the refractive index of said first fluid to thereby reversely refract said beam until a greater amount of radiation is incident upon one of said detectors, and wherein the voltage produced by said comparing means is of a first polarity and actuates said reversible motor in a first direction and thereby actuates said density changing means to increase the density of said second fluid.

11. An analyzer in accordance with claim 9 wherein said means for changing the density of said second fluid comprises means for decreasing the density of said second fluid and thereby for decreasing the index of refraction of said second fluid, in response to a decrease in the refractive index of said first fluid to thereby reversely refract said beam until a greater amount of radiation is incident upon one of said detectors and wherein the voltage produced by said comparing means is of a first polarity and actuates said reversible motor in a first direction and thereby actuates said density changing means to decrease the density of said second fluid.

References Cited in the file of this patent
UNITED STATES PATENTS

| | | |
|---|---|---|
| 830,225 | Haber | Sept. 4, 1906 |
| 1,264,374 | De Florez | Apr. 30, 1918 |
| 1,471,342 | Logan | Oct. 23, 1923 |
| 2,413,208 | Barnes | Dec. 24, 1946 |
| 2,427,996 | Seaman | Sept. 23, 1947 |
| 2,445,044 | Stamm et al. | July 13, 1948 |
| 2,462,995 | Ritzmann | Mar. 1, 1949 |
| 2,483,102 | Pierson | Sept. 27, 1949 |
| 2,529,030 | Latchum | Nov. 7, 1950 |
| 2,624,014 | Barstow | Dec. 30, 1952 |
| 2,686,454 | Ruska | Aug. 17, 1954 |
| 2,724,304 | Crawford | Nov. 22, 1955 |